(12) United States Patent
Kawada et al.

(10) Patent No.: US 6,952,449 B2
(45) Date of Patent: Oct. 4, 2005

(54) DETECTION APPARATUS FOR ROAD OBSTRUCTIONS

(75) Inventors: Ryoichi Kawada, Tokyo (JP); Masahiro Wada, Kanagawa (JP); Shuichi Matsumoto, Tokyo (JP)

(73) Assignee: KDDI Corporation, Tokyo (JP)

(*) Notice: Subject to any disclaimer, the term of this patent is extended or adjusted under 35 U.S.C. 154(b) by 741 days.

(21) Appl. No.: 09/873,276

(22) Filed: Jun. 5, 2001

(65) Prior Publication Data

US 2002/0005898 A1 Jan. 17, 2002

(30) Foreign Application Priority Data

Jun. 14, 2000 (JP) .................... 2000-178387

(51) Int. Cl.⁷ ................................. H04N 7/12
(52) U.S. Cl. .............. 375/240.16; 382/236; 348/143
(58) Field of Search .............. 375/240.16; 348/143, 348/149, 152, 155; 382/236

(56) References Cited

U.S. PATENT DOCUMENTS

| | | | |
|---|---|---|---|
| 5,371,539 A | * 12/1994 | Okino et al. | 348/208.6 |
| 5,699,443 A | * 12/1997 | Murata et al. | 382/107 |
| 5,745,169 A | * 4/1998 | Murphy et al. | 348/192 |
| 6,512,537 B1 | * 1/2003 | Shimizu et al. | 348/155 |
| 6,707,486 B1 | * 3/2004 | Millet et al. | 348/155 |
| 6,757,328 B1 | * 6/2004 | Huang et al. | 375/240.1 |

FOREIGN PATENT DOCUMENTS

| | | |
|---|---|---|
| JP | 64-046612 | 2/1989 |
| JP | 06-325287 | 11/1994 |
| JP | 10-289393 | 10/1998 |
| JP | 2000-074707 | 3/2000 |

OTHER PUBLICATIONS

Japanese Office Action dated Apr. 27, 2005.

* cited by examiner

*Primary Examiner*—Gims Philippe
(74) *Attorney, Agent, or Firm*—Westerman, Hattori, Daniels & Adrian, LLP

(57) ABSTRACT

Road area blocks of monitoring camera video data are extracted by a road area block extractor, and motion vectors are calculated by a motion vector calculator. A motion vector direction detector detects the directions of the motion vectors. In a normal state, the mean value Θ and the variance $\sigma_e^2$ of the directions θ of the motion vectors are calculated and accumulated in a statistics memory. In detection of road obstructions, the directions of the motion vectors detected by the motion vector direction detector are transmitted to an abnormal motion vector degree Q calculator. An abnormal motion vector degree Q is calculated on the basis of the statistics accumulated in the statistics accumulated in the statistics memory. A comparator compares the abnormal motion vector degree Q with a threshold. When the abnormal motion vector degree Q is equal to or larger than the threshold, road obstructions are decided. Therefore, according to the present invention, a detection apparatus for road obstructions which is not easily affected by changes in brightness and color in an image and which is not easily adversely affected by the color of a running vehicle is provided.

3 Claims, 3 Drawing Sheets

DETECTION APPARATUS FOR ROAD OBSTRUCTIONS

BACKGROUND OF THE INVENTION

1. Field of the Invention

The present invention relates to a detection apparatus for road obstructions using an image and, more particularly, to a detection apparatus for road obstructions which is designed to make it possible to accurately decide road obstructions such as wave-overtopping in a road video taken by a road monitoring camera.

2. Description of the Related Art

Conventionally, an inter-frame difference method has been proposed as a method of automatically detecting obstruction occurrence or the like on a road from monitor video data. According to this method, a differential data between pixel values of a present frame and a previous frame of the monitor camera video data is formed, and the differential data is used to search for obstructions on the road. A technique of forming a differential data between pixel values of a present frame and a previous frame of video data and detecting a moving object by using the differential data is exactly described in, for example, "Image Processing Handbook" issued from SHOKODO Co., Ltd. pp. 375–376, 1987.

For example, in order to detect occurrence of wave-overtopping (tidal wave) on a coast road to perform alarming by using the conventional method, a running vehicle and wave-overtopping must be accurately discriminated from each other in a differential data. For this purpose, the white of a wave and the color of a vehicle must be discriminated from each other.

However, many cameras for monitoring roads are monochromatic cameras, color data is rarely obtained. In addition, brightnesses in morning, day, and evening are considerably different from each other. For this reason, the discrimination is made excessively depending on the brightnesses, erroneous detections may be performed in many cases. Furthermore, when a vehicle having a color which is the same as or is similar to that of a wave is running, the running of the vehicle is erroneously detected as wave-overtopping in many cases.

SUMMARY OF THE INVENTION

It is an object of the present invention to provide a detection apparatus for road obstructions which is not easily adversely affected by changes in brightness and color in a video image and which is not easily adversely affected by the colors of running vehicles.

In order to achieve the object, the present invention is firstly characterized in that a detection apparatus for road obstructions for automatically monitoring obstructions on a road by using a remote monitoring camera comprises a motion vector calculator for calculating a motion vector of a video image in a road area; a motion vector direction detector for detecting the direction of the motion vector; and comparison means for comparing the direction of the motion vector with the average of the directions of pre-detected motion vectors in the road area in a normal state, and wherein, when it is determined by the comparison means that the direction of the motion vector is offset from the average of the motion vectors in the road area in the normal state by not less than a predetermined value, road obstructions are decided.

The present invention is secondly characterized in that a detection apparatus for road obstructions for automatically monitoring obstructions on a road by using a remote monitoring camera comprises a motion vector calculator for calculating a motion vector of a video image in a road area; a motion vector direction detector for detecting the direction of the motion vector; a statistics memory for accumulating the direction of the motion vector and at least the mean value and the pre-detected variance of the directions of pre-detected motion vectors in a road area in a normal state; and an abnormal motion vector degree calculator for calculating an abnormal motion vector degree from the direction of the motion vector detected by the motion vector direction detector and at least the mean value and the variance of the directions of the motion vectors in the road area in the normal state which are accumulated in the statistics memory, and wherein road obstructions are detected on the basis of the abnormal motion vector degree calculated by the abnormal motion vector degree calculator.

According to the first and second feature of the invention, since road obstructions are deleted on the basis of the directions of motion vectors on a road of a video image, road obstructions can be deleted without being adversely affected by a change in brightness of the video image, the color of a running vehicle, or the like.

DETAILED DESCRIPTION OF THE PREFERRED EMBODIMENT

The present invention will be described below with reference to the accompanying drawings. First, the principle of the present invention will be described below.

In a normal state in which road obstructions such as wave-overtopping do not occur, motion vectors of a video image on a road are detected, and statistics such as the directions (angles) and the variance of the motion vectors are calculated. The statistics are accumulated and stored as statistical characteristics of the motion vectors on the road caused by running of a vehicle in the normal state. Thereafter, motion vectors of the video image on a present road taken by the road monitoring camera are detected and compared with the statistical characteristics of the motion vectors on the road in the normal state.

In general, a running vehicle on a road runs along the road. On the other hand, wave-overtopping or the like attacks a road along a coast in a direction almost perpendicular to the road. For this reason, when a motion vector on a present road and a motion vector on the road in a normal state are compared with each other in statistical characteristics, if the former is largely different from the latter, it is understood that obstructions such as wave-overtopping occurs. The above is the principle of the present invention.

Figure 1:
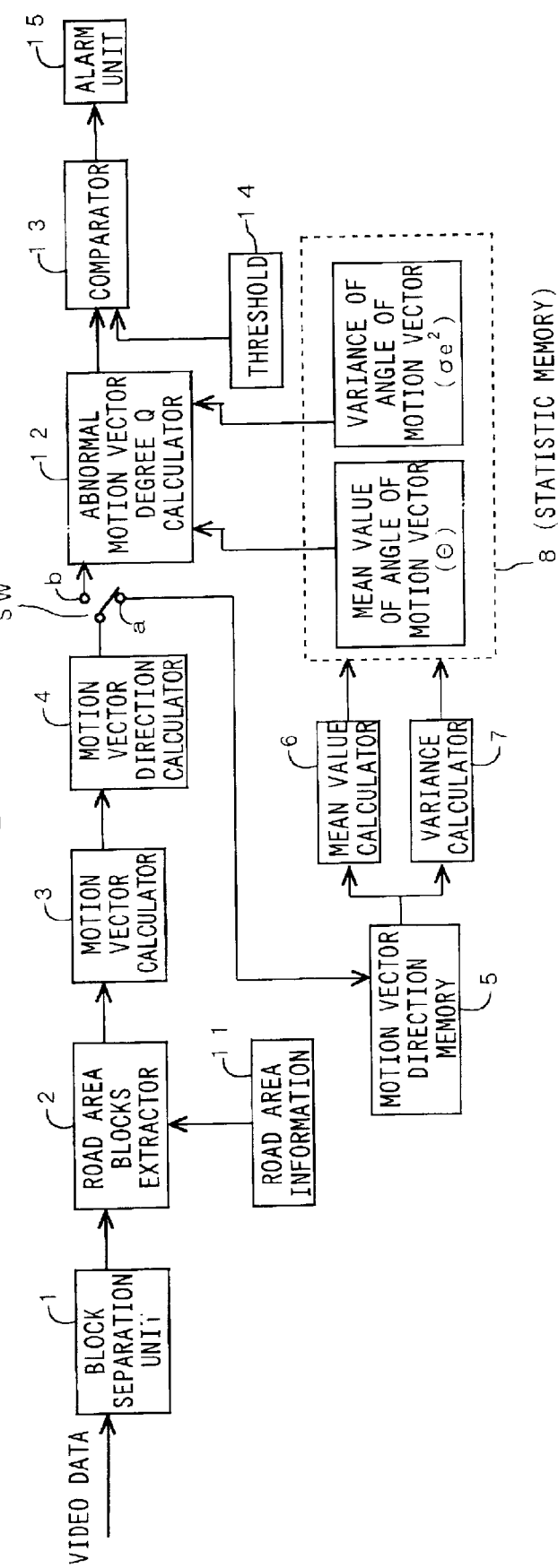
FIG. 1 is a functional block diagram showing a rough configuration of the first embodiment of the present invention.

Next, the functional configuration of an embodiment of the present invention will be described below with reference to FIG. 1. FIG. 1 is a functional block diagram of a system having a function of calculating statistical characteristics of a motion vector on a road caused by running of a vehicle in a normal state in which road obstructions such as wave-overtopping do not occur and a function of detecting road obstructions such as wave-overtopping.

In FIG. 1, video data taken by a road monitoring camera are input to a block separation unit 1. Here, the road monitoring camera may be fixed or movable. The block separation unit 1 separates the input video data into, for example, blocks each having a size of 16 pixels×16 pixels. Next, the blocks formed by the block separation unit 1 are transmitted to a road area blocks extractor 2.

Figure 2:
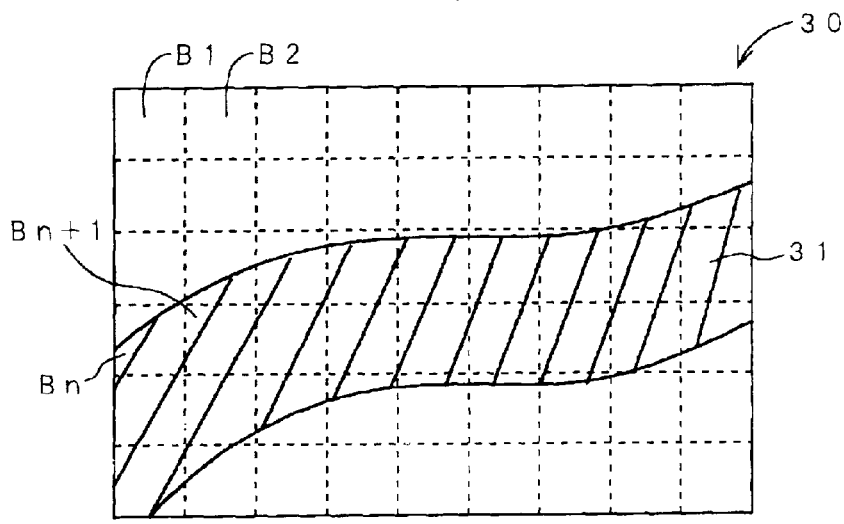
FIG. 2 is a diagram for explaining a video image taken by a road monitoring camera and an example of road area blocks.

The road area blocks extractor 2 refers to a road area information 11 which is calculated in advance to decide whether input blocks are road area blocks or not. The road area blocks extractor 2 discards blocks which are not road area blocks and employs only road area blocks to transmit the road area blocks to a motion vector calculator 3. For example, when the video image in a screen 30 is an image shown in FIG. 2, and when a road area is a hatched area 31, blocks B1, B2, . . . , which are not in the hatched area 31 are discarded, and blocks $B_n$, $B_{n+1}$, . . . , which are in the hatched area 31 are employed. Detection of the road area information 11 when the road monitoring camera is movable can be performed by the patent application (Japanese Patent Application No. 2000-051413) "Detection Apparatus for Road Obstructions" or the like filed by the present applicant.

The motion vector calculator 3 calculates motion vectors for respective input blocks $B_n$, $B_{n+1}$, . . . , and outputs the results to a motion vector direction (angle) calculator 4. The motion vector direction calculator 4 detects angles θ of the input motion vectors.

Since a switching unit SW is connected to a terminal a, outputs from the motion vector direction calculator 4 are accumulated in the motion vector direction memory 5. When data of N frames of monitoring camera video data are accumulated in the motion vector direction memory 5, a mean value calculator 6 and a variance calculator 7 are operated. The mean value calculator 6 calculates a mean value Θ of angles θ of the motion vectors of the road area blocks, i.e., angles θ of the motion vectors to the horizontal axis on the image screen as an average of the N frames by the following Equation (1):
[Equation 1]

$$\Theta = \frac{1}{N} \sum_{i=0}^{N} \theta_i \quad (1)$$

where $\theta_i$ represents an angle of a motion vector of the ith block of the ith frame.

Figure 3:
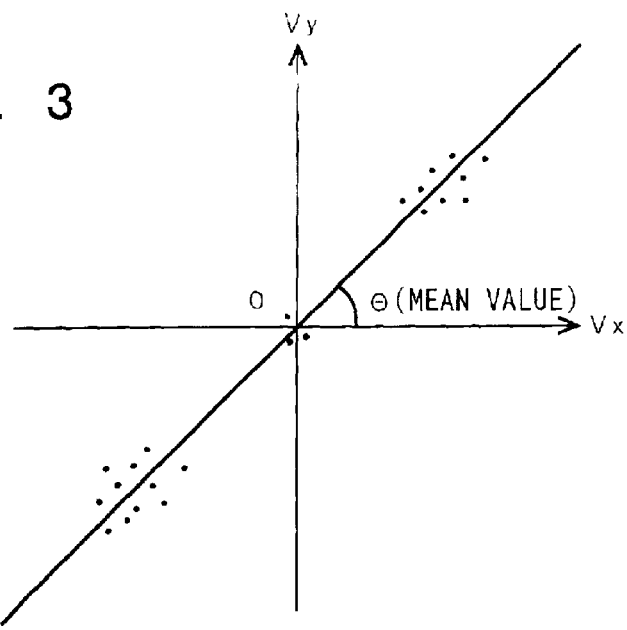
FIG. 3 is a graph showing a mean value of motion vector directions of a block of road area blocks in a normal state.

In a normal state, a motion vector on a road is generated as a motion vector of a vehicle when the vehicle is running, i.e., a motion vector is generated in a direction along the road. When a vehicle is not running, there is no motion vector (0 vector). Therefore, when a mean value Θ of the angles θ of the motion vectors is calculated, the typical direction of a vector on the road in the normal state can be calculated by Equation (1). For example, a mean value Θ of the angles θ of motion vectors of a block in the road area is as shown in FIG. 3. The abscissa in FIG. 3 indicates x components (Vx) of the motion vectors, and the ordinate in FIG. 3 indicates y components (Vy). A straight line in FIG. 3 indicates an average of directions of the motion vectors of the certain block through the N frames. Since Equation (1) includes a motion vector (0 vector) obtained when no vehicle is running, a mean value Θ of motion vectors except for the 0 vector may be calculated.

The variance calculator 7 calculates a variance of the directions of the motion vectors of respective blocks. The variance indicates the degree of variation of the motion vectors on the road in the normal state from the average, and the variance can be considered as the second parameter. The variance $\sigma_e^2$ can be calculated from Equation (2) as follows:
[Equation 2]

$$\sigma_e^2 = \frac{1}{N} \sum_{i=0}^{N} (\theta_i - \Theta)^2 \quad (2)$$

In this equation, N, $\theta_i$, and Θ are the same as those in Equation (1), respectively. In the variance, a variance related to a block in which no motion vector is generated can also be excepted from the calculation of the variance.

As described above, typical statistics related to motion vectors in a normal state, i.e., mean values Θ and variances $\sigma_e^2$ of the angles θ of the motion vectors of the respective road area block can be calculated. These mean values Θ and variances $\sigma_e^2$ are stored in a statistics memory 8.

An operation performed when road obstructions such as wave-overtopping are detected will be described below. In this case, the switching unit SW is connected to a terminal b.

In this case, since the operations of the block separation unit 1, the road area blocks extractor 2, the motion vector calculator 3, and the motion vector direction calculator 4 are the same as those in the above operation, a description thereof will be omitted.

The directions of the motion vectors of road area blocks detected by the motion vector direction calculator 4 are input to an abnormal motion vector degree Q calculator 12. The abnormal motion vector degree Q calculator 12 discriminates whether the angles θ (=θ0) of the motion vectors detected by the motion vector direction calculator 4 are generated by a running vehicle or road obstructions such as wave-overtopping.

It is considered that probabilities P(θ0) that the angles θ0 of the motion vectors detected by the motion vector direction calculator 4 are generated by a running vehicle are plotted to have a normal distribution as expressed by the following Equation (3).
[Equation 3]

$$P(\theta_0) = \frac{1}{\sqrt{2\pi\sigma_e^2}} \exp\left(-\frac{(\theta_0 - \Theta)^2}{2\sigma_e^2}\right) \quad (3)$$

Therefore, in contrast to this, when the directions of observed motion vectors in a certain block in the road area are θ0, an abnormal motion vector degree Q in the block can be calculated by the following Equation (4). The maximum value is 1, and the minimum value 0.
[Equation 4]

$$Q = 1 - \sqrt{2\pi\sigma_e^2} \, P(\theta_0) = 1 - \exp\left(-\frac{(\theta_0 - \Theta)^2}{2\sigma_e^2}\right) \quad (4)$$

The comparator 13 compares the abnormal motion vector degree Q of the respective blocks in the road area with a threshold 14 (for example, 0.5). If at least one of the abnormal motion vector degree Q of the blocks is larger than the threshold 14, it is understood that wave-overtopping or the like occurs on the road, and alarm unit 15 is operated.

As described above, according to the embodiment, road obstructions are detected on the basis of the motion vectors of respective blocks in a road area of a video image taken by a road monitoring camera. For this reason, a detection apparatus for road obstructions which is not easily affected by changes in brightness and color in a video image and which is not easily adversely affected by the color or the like of a running vehicle can be provided.

Figure 4:
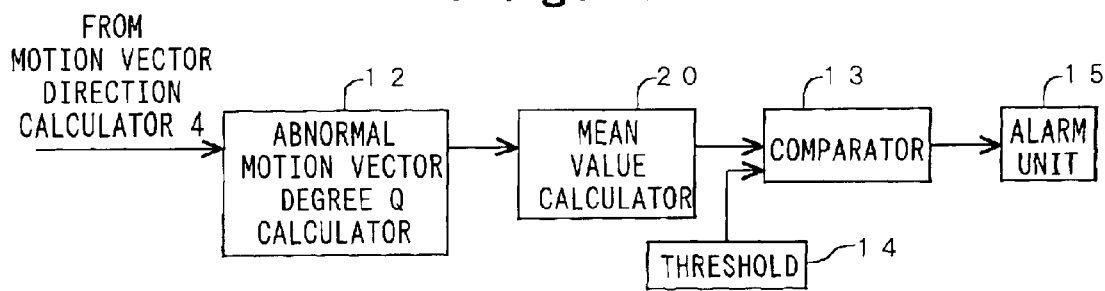
FIG. 4 is a block diagram showing a main part of a modification of the first embodiment.

As a modification of the embodiment, as shown in FIG. 4, the mean values of abnormal motion vector degree Q may be calculated by a means value calculator 20, and the mean values and the threshold 14 may be compared with each other. According to this modification, even though little wave-overtopping, a flying bird, or the like is detected, the alarm unit 15 does not operate. When the threshold 14 is adjusted to an appropriate value, a level for detecting road obstructions can be set to be an appropriate level.

Figure 5:
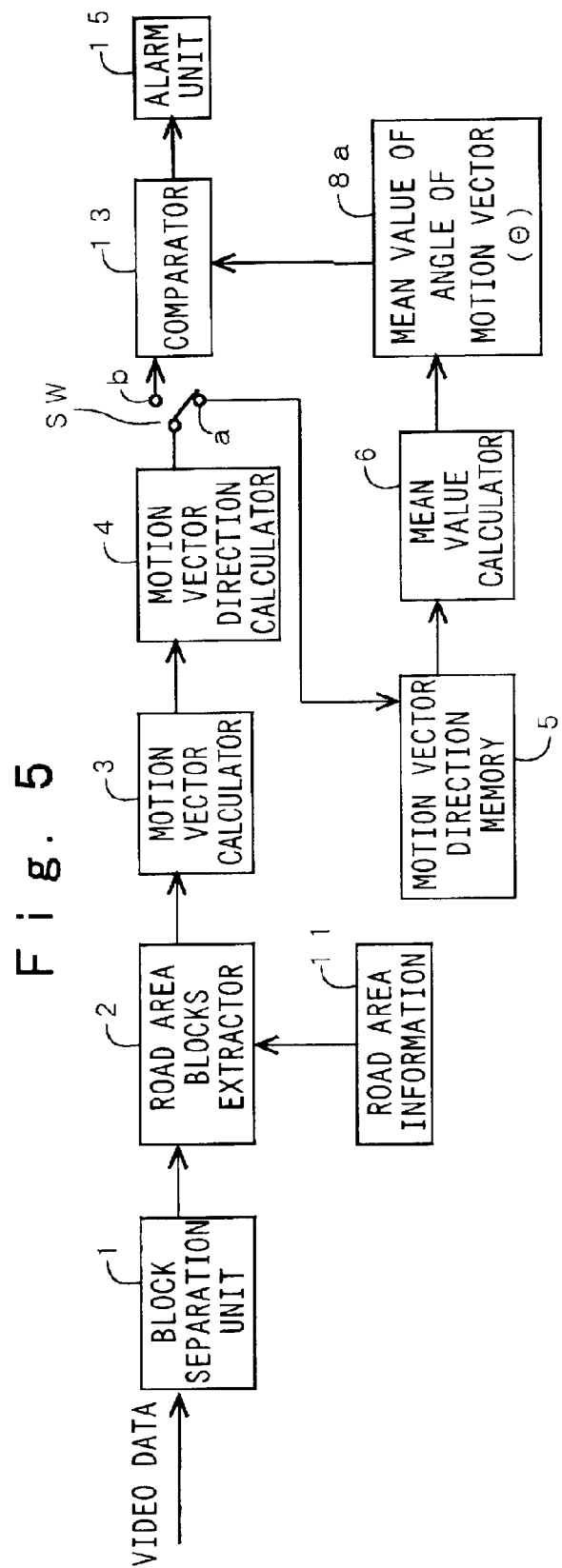
FIG. 5 is a functional block diagram showing a rough configuration of the second embodiment of the present invention.

The second embodiment of the present invention is shown in FIG. 5. When this embodiment is compared with the first embodiment, the second embodiment has the following characteristics. That is, attention is given to only the directions of the motion vectors of respective blocks in a road area of a video image taken by a road monitoring camera to detect road obstructions. More specifically, in a normal state on the road, the mean values of the directions of the motion vectors of respective blocks in the road area of the video image are calculated by a mean value calculator 6, so that the mean values $\Theta$ are accumulated in a memory 8 in advance.

A switching unit SW is connected to a terminal b to monitor the road. The angle $\theta$ of a motion vector detected by a motion vector direction calculator 4 is transmitted to a comparator 13 to be compared with the mean values $\Theta$ of the directions of the motion vectors. When the angle $\theta$ is offset from the mean value $\Theta$ by a predetermined value ($=\alpha$) or more, i.e., $\theta \geq \Theta+\alpha$ or $\theta \leq \Theta-\alpha$ is established, it is determined that road obstructions occur, and an alarm unit 15 is operated.

As a modification of the first embodiment, the following configuration may be employed. That is, a mean value calculator may be arranged at the previous row of the comparator 13, and after the directions of the motion vectors of respective blocks may be averaged in units of blocks over a plurality of frames, the means values may be compared with threshold 14 by the comparator 13 as described above.

As is apparent from the above description, according to the present invention, road obstructions are detected on the basis of the directions of motion vectors on a road of a video image taken by a road monitoring camera. For this reason, unlike a conventional system, road obstructions can be detected without being adversely affected by a change in brightness of the video image in morning, day, and evening, the color of a running vehicle, or the like. Therefore, the road obstructions can be accurately detected or discriminated.

When the present invention is used to detect road obstructions such as wave-overtopping along a coast road, the present invention is especially advantageous.

What is claimed is:

1. A detection apparatus for road obstructions for automatically monitoring obstructions on a road by using a remote monitoring camera, comprising:

a motion vector calculator for calculating a motion vector of a video image in a road area;

a motion vector direction detector for detecting the direction of the motion vector;

a statistics memory for accumulating the direction of the motion vector and at least the mean value and the pre-detected variance of the directions of pre-detected motion vectors in a road area in a normal state; and an abnormal motion vector degree calculator for calculating an abnormal motion vector degree from the direction of the motion vector detected by the motion vector direction detector and at least the mean value and the variance of the directions of the motion vectors in the road area in the normal state which are accumulated in the statistics memory, and wherein road obstructions are detected on the basis of the abnormal motion vector degree calculated by the abnormal motion vector degree calculator.

2. A detection apparatus for road obstructions according to claim 1, wherein the motion vector calculator calculates motion vectors of respective blocks of a video image in a road area, and the motion vector direction detector detects the directions of the motion vectors of the respective blocks.

3. A detection apparatus for road obstructions according to claim 1, wherein the abnormal motion vector degree calculator calculates an abnormal motion vector degree Q of a motion vector $\theta\mathbf{0}$ by following expression when the mean value and the variance of the directions of the motion vectors in the road area in the normal state are represented by $\Theta$ and $\sigma_e^2$, respectively $$Q=1-\exp(-(\theta 0-\Theta)^2/2\sigma_e^2).$$

* * * * *